E. L. BORDWELL.
NUT LOCK.
APPLICATION FILED AUG. 16, 1916.

1,229,872.

Patented June 12, 1917.

Witnesses
Frederick W. Ely
L. Wilcox

Inventor
E. L. Bordwell.
By Victor J. Evans
Attorney

UNITED STATES PATENT OFFICE.

EDWARD L. BORDWELL, OF MARYSVILLE, CALIFORNIA.

NUT-LOCK.

1,229,872. Specification of Letters Patent. Patented June 12, 1917.

Application filed August 16, 1916. Serial No. 115,254.

*To all whom it may concern:*

Be it known that I, EDWARD L. BORDWELL, a citizen of the United States, residing at Marysville, in the county of Yuba and State of California, have invented new and useful Improvements in Nut-Locks, of which the following is a specification.

This invention relates to nut locks and it consists in the novel features hereinafter described and claimed.

An object of the invention is to provide a nut lock of simple and durable structure adapted to be applied to a bolt and consisting of a locking or jam nut adapted to engage a nut for the purpose of holding the same in position upon the bolt.

With this object in view the bolt is provided at its end with a shaft extension which is threaded. The primary nut is provided at its outer face with a recess having an inclined or curved bottom. The primary nut engages the thread of the bolt in the usual manner and a locking nut is threaded upon the said shaft and is provided with a curved face adapted to engage the bottom of the said recess in the primary nut whereby the said primary nut is securely held in position upon the bolt.

In the accompanying drawing:—

Figure 1:
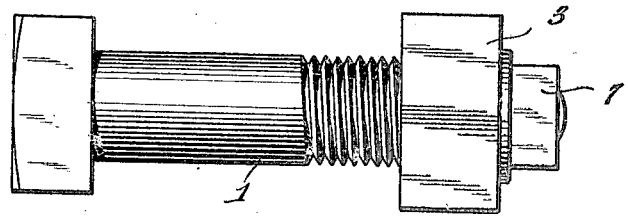
Figure 1 is a side elevation of a bolt showing the nut lock applied.
Figure 2:
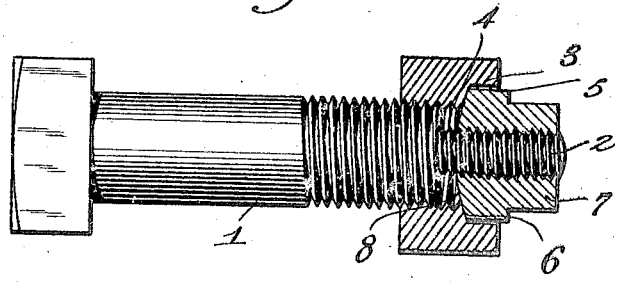
Fig. 2 is a similar view of the same with parts in section.
Figure 3:
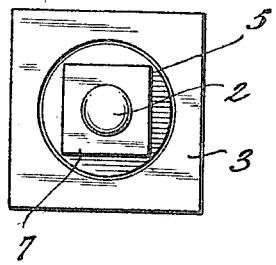
Fig. 3 is an end view of the same.

As illustrated in the accompanying drawing, the bolt 1 is provided at its end with a shaft extension 2 which is externally threaded. The said threads on the extension 2 may be right or left hand as desired. The primary nut 3 is provided with a threaded aperture 4 adapted to engage the thread on the bolt 1 in the usual manner. The said primary nut is provided at its outer face with a recess 5 having a curved bottom wall 6. A lock nut 7 is provided with a threaded aperture adapted to engage the thread upon the extension 2. The said lock nut is further provided with a curved wall 8 adapted to engage against the curved wall 6 of the recess 5 when the lock nut is applied to the extension 2.

It is apparent that when the primary nut is adjusted on the bolt 1 and the lock nut 7 is screwed upon the extension 2 the curved surface of the said lock nut engages the curved wall of the recess 5 whereby a wedging action is had between the lock nut and the primary nut which forces and securely holds the primary nut at the adjusted position upon the bolt. When it is desired to remove the primary nut from the bolt the lock nut 7 is unscrewed from the extension 2 and the said primary nut 3 may be unscrewed from the bolt.

Having described the invention what is claimed is:—

In combination with a threaded bolt having at its end a shaft extension which is threaded, a primary nut having a threaded aperture adapted to engage the thread upon the bolt, said primary nut being provided at its outer face with a recess having a curved bottom wall, and a lock nut having a threaded aperture adapted to engage the thread upon the shaft extension, said lock nut being provided with a curved face adapted to engage the curved bottom wall of the recess when the lock nut is applied to the said shaft extension whereby the primary nut is jammed in position on the bolt.

In testimony whereof I affix my signature.

EDWARD L. BORDWELL.

Copies of this patent may be obtained for five cents each, by addressing the "Commissioner of Patents, Washington, D. C."